Figure 1:
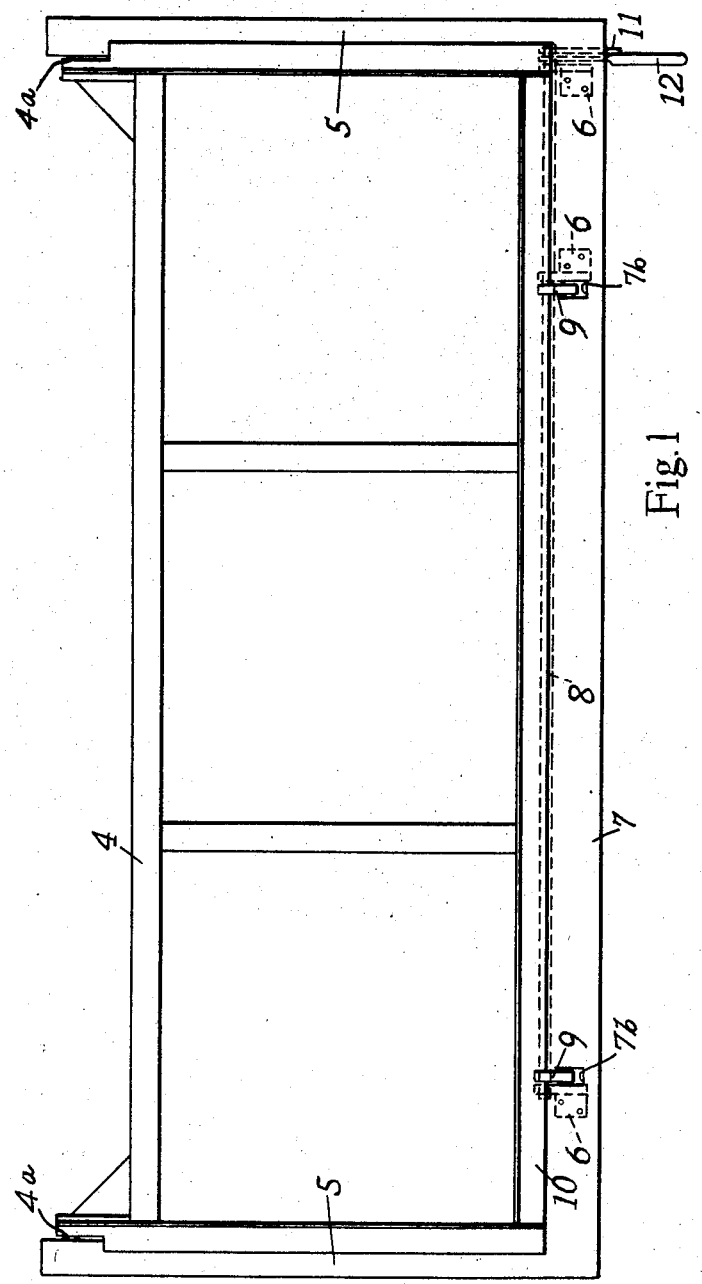

June 23, 1959 W. H. MEATS 2,891,816
FASTENING FOR A TAIL BOARD OF A TIPPING VEHICLE
Filed Jan. 8, 1957 2 Sheets-Sheet 1

Inventor
W.H.Meats
By Glascock Downing Seebold
Attys.

June 23, 1959     W. H. MEATS     2,891,816
FASTENING FOR A TAIL BOARD OF A TIPPING VEHICLE
Filed Jan. 8, 1957     2 Sheets-Sheet 2
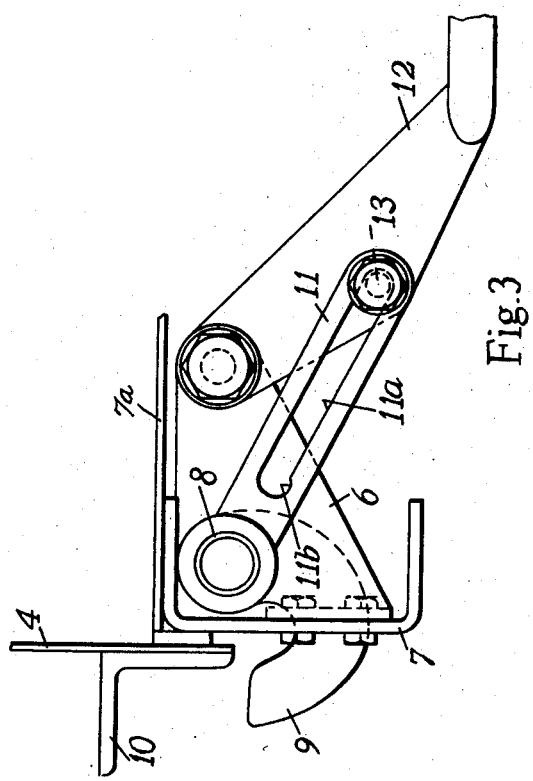
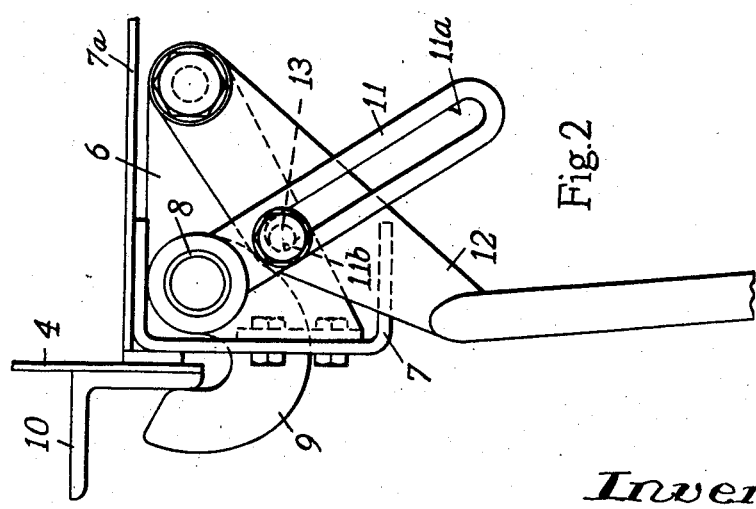
Inventor
W. H. Meats United States Patent Office 2,891,816
Patented June 23, 1959

1

2,891,816

FASTENING FOR A TAIL BOARD OF
A TIPPING VEHICLE

William Henry Meats, Cheltenham, England, assignor to
Telehoist Limited, Cheltenham, England Application January 8, 1957, Serial No. 633,134

Claims priority, application Great Britain
July 2, 1956

1 Claim. (Cl. 298—38)

The object of this invention is to provide a fastening for a tail board of a tipping vehicle in a convenient form.

A fastening according to the invention comprises the combination of an angularly movable shaft mounted transversely on the body or the tail board of the vehicle, two or more hook-shaped members on the shaft adapted to engage parts on the tail board or the body respectively, a slotted and radially disposed arm on the shaft at or adjacent one end, and a manually operable and pivotally mounted lever having a part engaging the slot in the arm, the arrangement being such that angular movement of the lever imparts angular movement to the shaft about its axis, whilst the interaction of the lever and arm in the operative position of the fastening serves to resist angular movement of the shaft.

In the accompanying drawings Figure 1 is a rear view of a vehicle body incorporating an example of the invention, and Figures 2 and 3 are side views to an enlarged scale showing the fastening in the operative and inoperative positions respectively.

In the illustrated example of the invention the body of a tipping vehicle is provided with a tail board 4 which is pivotally mounted at 4a on the side boards 5 of the body to hinge about an axis at or adjacent its upper edge. Mounted on brackets 6 on a transverse member 7 beneath the rear of the floor 7a of the body is a transversely extending shaft 8 which is rotatably movable about its axis. On this shaft are secured two or more spaced hook-shaped members 9 which (when the tail board is in the closed position) are adapted to engage (through slots 7b in the member 7) with an angle-section cross-bar 10 at the lower and free edge of the tail board 4 to hold the latter in the closed position.

At or adjacent one end of the shaft 8 there is secured to the latter a radially extending arm 11 in which is formed a slot 11a, and pivotally mounted on one of the brackets 6 is a manually operable lever 12 having a pin or other part 13 engaging in the slot 11a in the arm. The arrangement is such that angular movement of the lever 12 will impart rotatable movement to the shaft 8 between the operative position of the fastening (seen in Figure 2) in which the hook-shaped members 9 are in a position to engage the cross-bar 10 on the tail board, and an inoperative position of the fastening (seen in Figure 3) in which the members 9 are removed from the cross-bar 10. Also the interaction of the lever 12 and arm 11 in the operative position of the fastening serves to resist movement of the shaft, as by a force applied to the tail board 4 in an opening direction. For this latter purpose the lever 12 may be arranged to move to an "over centre" position relative to the arm immediately prior to reaching the operative position, in which the angle included between a line joining the pin or other part 13 to the pivot axis of the lever 12, and a line joining the said pin or other part 13 to the axis of the shaft 8 is slightly more than a right angle. Further a recess 11b is formed in the edge of the slot 11a at the end which is engaged by the part 13 in the operative position of the fastening, thereby providing an additional safety precaution to prevent inadvertent opening of the tail board.

It will be appreciated that in an alternative construction the shaft 8 and lever 12 could be mounted on brackets on the tail board, and the hook-shaped members 9 could be arranged to engage parts on the body.

Having thus described my invention what I claim as new and desire to secure by Letters Patent is:

A fastening for a tail board pivoted in the region of its upper edge to the rear end of the body of a tipping vehicle, comprising in combination with the tail board and vehicle body, a shaft capable of rotational movements about its axis and mounted in the region of, and parallel with, the lower edge of the tail board on one of a pair of supports formed respectively by the tail board and vehicle body, at least two hook-shaped members secured at spaced positions on said shaft, complementary means on the other of said supports engageable by said hook-shaped members to retain said tail board in a service position in which it closes the rear end of said vehicle body, a radial arm secured at one end on said shaft and provided with a longitudinal slot, and a manually operable lever having one end pivoted to the shaft support at a position spaced from said shaft, and having thereon a projection slidably engaging the longitudinal slot in said arm so that said lever, by its interaction with said arm, can serve not only to impart rotational movements to said shaft about its axis for moving said hook-shaped members into and out of engagement with said complementary means, but also to resist inadvertent rotational movement of said shaft from an operative position in which said hook-shaped members engage said complementary means, said slot having at the end nearest to said shaft a recess which serves by engagement with the projection on said lever to afford an additional safety precaution against inadvertent rotational movement of said shaft from said operative position.

References Cited in the file of this patent

UNITED STATES PATENTS

| 1,663,475 | Cartzdafner | Mar. 20, 1928 |
| 1,788,488 | Hirschmann | Jan. 13, 1931 |
| 2,012,595 | Anderson | Aug. 27, 1935 |
| 2,016,267 | Fleming | Oct. 1, 1935 |
| 2,679,418 | Cisco | May 25, 1954 |